United States Patent
Harding (10) Patent No.: US 7,617,294 B1
(45) Date of Patent: Nov. 10, 2009

(54) METHOD AND APPARATUS FOR REDUCING LATENCY INVOLVED IN RETRIEVING WEB PAGE COMPONENTS

(75) Inventor: Michael A. Harding, El Granada, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 946 days.

(21) Appl. No.: 10/910,432

(22) Filed: Aug. 2, 2004

(51) Int. Cl.
G06F 15/16 (2006.01)

(52) U.S. Cl. .................... 709/217; 370/229
(58) Field of Classification Search ........... 709/200, 709/217; 703/1; 707/10; 715/236
See application file for complete search history.

(56) References Cited

U.S. PATENT DOCUMENTS

| | | | |
|---|---|---|---|
| 6,271,840 B1* | 8/2001 | Finseth et al. ............. 715/236 |
| 6,397,246 B1* | 5/2002 | Wolfe ...................... 709/217 |
| 2003/0120658 A1* | 6/2003 | Carneal et al. ............ 707/10 |
| 2005/0027788 A1* | 2/2005 | Koopmans et al. ......... 709/200 |
| 2005/0228621 A1* | 10/2005 | Matsuo et al. ............ 703/1 |

* cited by examiner

Primary Examiner—Ramy M Osman
Assistant Examiner—Marshall McLeod
(74) Attorney, Agent, or Firm—Park, Vaughan & Fleming, LLP; Shun Yao (57) ABSTRACT

One embodiment of the present invention provides a system for reducing the latency in retrieving a web page. The system receives a request from a browser to retrieve a target web page, wherein the request is received at a proxy server, which can retrieve the target web page through a low-latency Internet connection. The system then forwards the request to a host server. After receiving components comprising the target web page, the system generates a substitute web page which includes a graphical image of the target web page, and transfers the substitute web page to the browser. If the browser has a high-latency Internet connection, delivering the substitute web page instead of the actual target web page can avoid the latency involved in transferring the components of the target web page individually through the high-latency Internet connection, each of which may involve a separate round-trip delay. The system can instead transfer a single graphical image of the target web page through the high-latency Internet connection, which involves only a single round-trip delay.

21 Claims, 6 Drawing Sheets

METHOD AND APPARATUS FOR REDUCING LATENCY INVOLVED IN RETRIEVING WEB PAGE COMPONENTS

BACKGROUND

1. Field of the Invention

The present invention relates to techniques for accessing web pages. More specifically, the present invention relates to a method and an apparatus for reducing the latency involved in retrieving web page components.

2. Related Art

The Internet presently enables a user with a simple Internet connection to navigate through millions of web sites containing media-rich web pages. However, not every Internet connection is created equal. Although connection speeds have been constantly increasing (e.g., from a 14.4 kbps dial-up connection to a 256 kbps DSL connection), other factors may still adversely affect the performance of Internet applications. In particular, latency plays a critical role in loading web pages. Web pages containing a large number of components (such as images) may suffer significantly from the latency involved in retrieving these components. This is because a web browser needs to download each component individually, and each download involves at least a round-trip delay between the browser and the server to set up a temporary connection (such as a TCP or a UDP connection). Furthermore, a web browser can only transfer a limited number of components concurrently.

Figure 1:
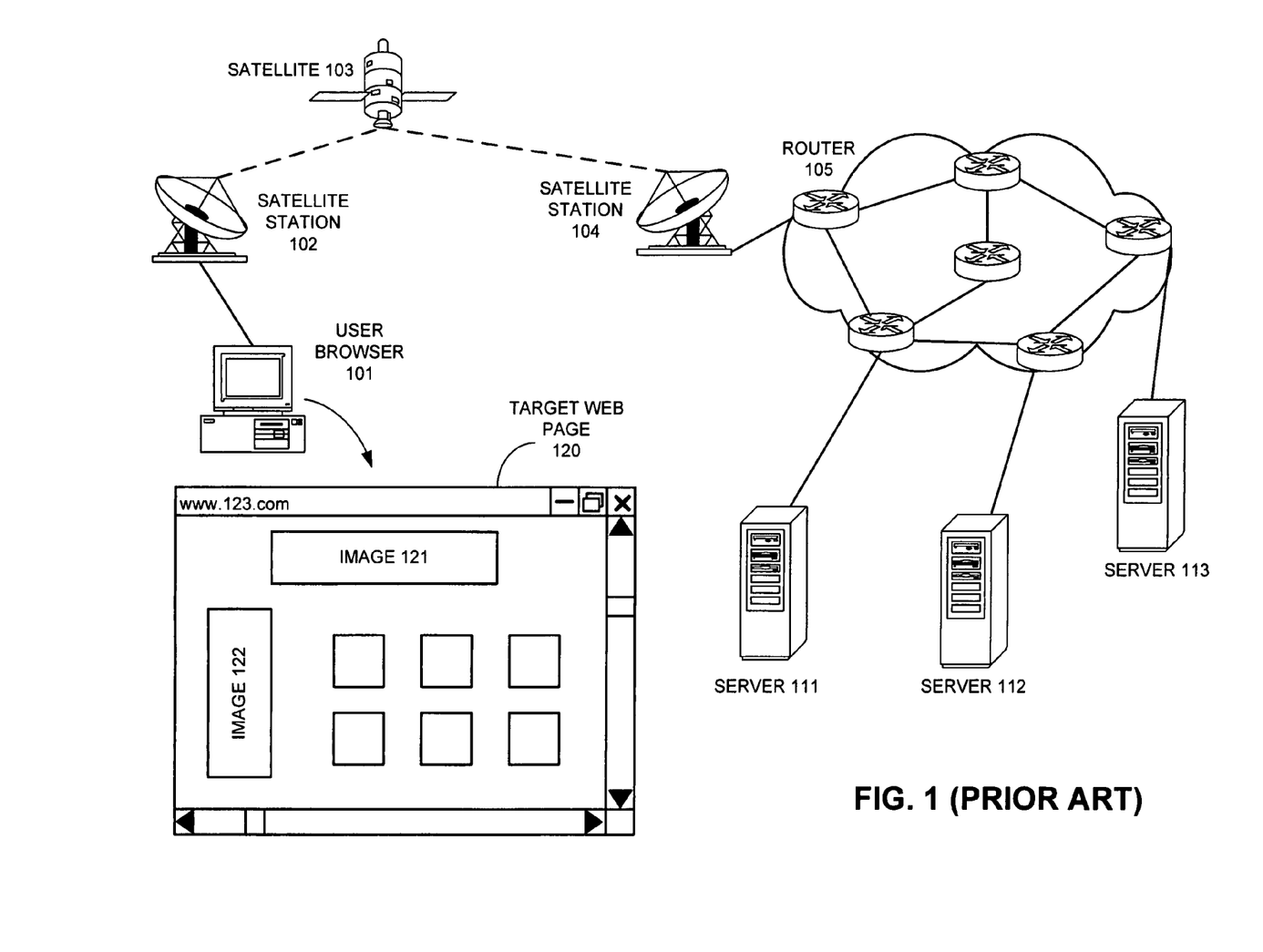
FIG. 1 illustrates the process of loading a web page over a satellite Internet connection.

This latency-prone component-retrieval process can significantly impair browser performance over connections with long latency. One such example is broadband satellite Internet connection, as shown in FIG. 1. Satellite Internet connections are capable of providing very high bandwidth. Unfortunately, the high altitude of geosynchronous satellites (more than 20,000 miles above the earth) creates a long round-trip delay between a client (browser) and a server. This latency is typically several hundred milliseconds. If we assume that a satellite Internet connection has a round-trip latency of 500 ms, and that a browser can at most transfer four components at a time, loading a web page with 100 components requires at least 12 seconds! Note that the fast data transfer rate provided by a satellite connection cannot reduce this latency, because the latency is determined by the physical distance the signal has to travel. This can result in a very frustrating experience for a user with a satellite broadband connection, because his high-bandwidth connection can have a worse performance than that of a dial-up connection.

Hence, what is needed is a method and an apparatus for reducing the latency involved in retrieving web page components.

SUMMARY

One embodiment of the present invention provides a system for reducing the latency in retrieving a web page. The system receives a request from a browser to retrieve a target web page, wherein the request is received at a proxy server, which can retrieve the target web page through a low-latency Internet connection. The system then forwards the request to a host server. After receiving components comprising the target web page, the system generates a substitute web page which includes a graphical image of the target web page, and transfers the substitute web page to the browser. If the browser has a high-latency Internet connection, delivering the substitute web page instead of the actual target web page can avoid the latency involved in transferring the components of the target web page individually through the high-latency Internet connection, each of which may involve a separate round-trip delay. The system can instead transfer a single graphical image of the target web page through the high-latency Internet connection, which involves only a single round-trip delay.

In a variation of this embodiment, the system assembles the target web page from the received components in a virtual terminal environment.

In a further variation, generating the substitute web page involves capturing the assembled target web page to the graphical image.

In a further variation, the system allows the browser or a user associated with the browser to specify a resolution of the graphical image, thereby controlling the size of the graphical image.

In a further variation, the system analyzes the assembled target web page and generates an image map corresponding to the graphical image, wherein the hyperlinks contained within the target web page are specified in the image map.

In a further variation, transferring the graphical image of the target web page to the browser involves sending both the graphical image and the image map to the browser.

In a further variation, the system stores the graphical image and the image map in a storage device, so they may be re-sent to the browser if the browser sends a subsequent request to retrieve the same target web page.

In a further variation, the system stores the received components of the target web page in a storage device, so that the stored components may be easily retrieved if the browser sends a subsequent request to retrieve a web page that contains some of the stored components.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Example of Slow Web Loading Due to Latency

FIG. 1 illustrates the process of loading a web page over a satellite Internet connection. This satellite Internet connection includes a user-side satellite station 102, a geosynchronous satellite 103, and a network-side satellite station 104, wherein satellite station 104 is coupled to the Internet and functions as an Internet gateway for the user.

The Internet contains a number of routers, such as router 105, which are responsible for forwarding packets to their destinations. When the user requests a web page, the request is typically directed to a host server which stores the web page's source code (e.g., the Hyper Text Markup Language (HTML) file). A web page may include a number of components. For example, a component of a web page can be an image file. The image file can be located either on the same web server as the source code or on a separate server located somewhere else in the Internet.

When user browser 101 retrieves a component of a web page, the browser individually communicates with the server storing the component. Because a browser typically can only download a limited number of components simultaneously, the latency between user browser 101 and the servers storing components can have a large effect on the time required to load the web page.

In the example illustrated in FIG. 1, user browser 101 requests a target web page 120, which contains a number of components, such as images 121 and 122. Note that the source code for target web page 120 is stored on server 113, whereas images 121 and 122 are stored on servers 111 and 112, respectively. Because geosynchronous satellite 103 is more than 20,000 miles away from the earth, the round-trip delay between a user browser 101 and any server located on earth will be more than 400 ms. If target web page 120 contains 100 components, and if user browser 101 can only download four components concurrently, the user will experience more than 10 seconds of latency in loading target web page 120.

Note that, having faster connection speed does not solve the latency problem. Even if the satellite link operates at 10 Mbps, and an image component is only 20 KB, it still takes more than 400 ms to transfer the image. This is because the total latency involved in downloading a component is comprised of propagation delay and transmission delay. Having a high-speed connection only reduces the transmission delay, which is the amount of time necessary to transmit all the bits of a file onto a link. In contrast, propagation delay is determined by the actual physical distance the signal has to travel and the signal's propagation speed. Therefore, as shown in FIG. 1, a high-latency Internet connection may significantly impair the performance of a web browser in retrieving a web page.

Reducing Web-loading Latency with Substitute Web Pages

Figure 2:
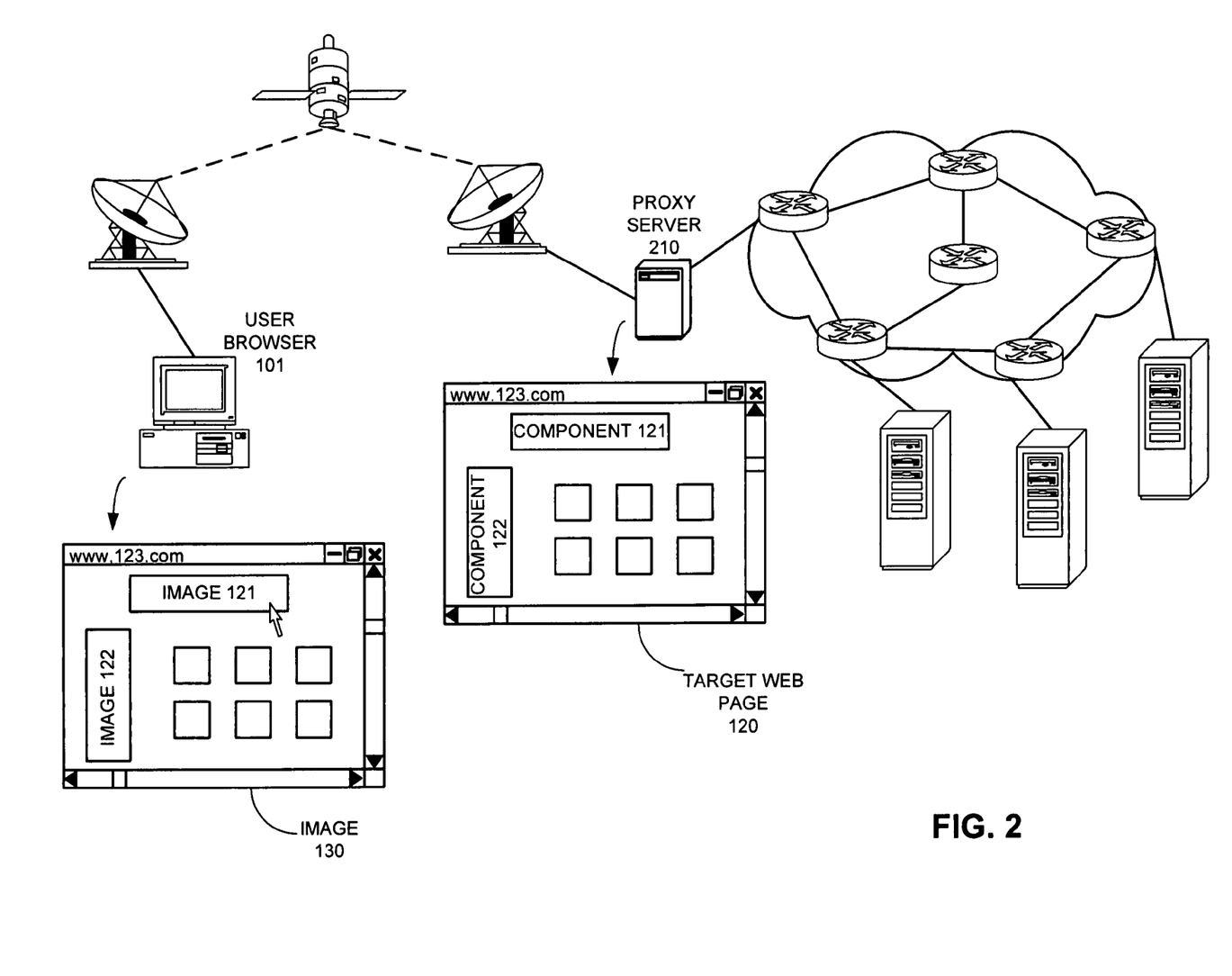
FIG. 2 illustrates the process of generating a substitute web page at a proxy server in accordance with an embodiment of the present invention.

FIG. 2 illustrates the process of generating a substitute web page at a proxy server in accordance with an embodiment of the present invention. One way to reduce the latency involved in retrieving web page components is to reduce the number components the user browser has to download through the high-latency Internet connection. To achieve this goal, it is possible to consolidate the entire web page into just a few components, so that the user browser no longer has to download each component individually through the high-latency Internet connection. Moreover, this consolidation may occur at a proxy server that has a low-latency connection to the Internet.

As shown in FIG. 2, user browser 101 first sends a request to a proxy server 210 to retrieve target web page 120. Subsequently, proxy server 210 forwards the request to the host server storing the source code of web page 120 over a low-latency connection to the Internet. After receiving the source code, proxy server 210 interprets the received source code and assembles target web page 120 in a virtual terminal environment. During this assembly process, proxy server 210 requests individual components comprising target web page 120. Because the latency between proxy server 210 and the other servers is relatively small compared with the latency between user browser 101 and the servers, the assembly process completes in a relatively short time.

After proxy server 210 successfully assembles target web page 120, it captures a graphical image of target web page 120 and stores the image in a file. Proxy server 210 also analyses the hyperlinks in target web page 120 and creates a corresponding image map that assigns certain regions of the graphical image to corresponding hyperlinks. Finally, proxy server 210 generates a substitute web page, which includes the captures image of target web page 120 and the image map. The source code of this substitute web page is then sent to the user browser 101.

After receiving the substitute web page's source code, user browser 101 requests the components specified in the source code, which are stored in proxy server 210. Note that there can be as few as only two components: a graphical image 130 corresponding to target web page 120, and the corresponding image map. Hence, the number of components user browser 101 has to actually download is significantly reduced, and the web-page retrieval speed can be considerably improved.

In one embodiment of the present invention, a browser or a user may specify the resolution of image 130, thereby controlling the size of the graphical image of target web page 120.

Figure 3:
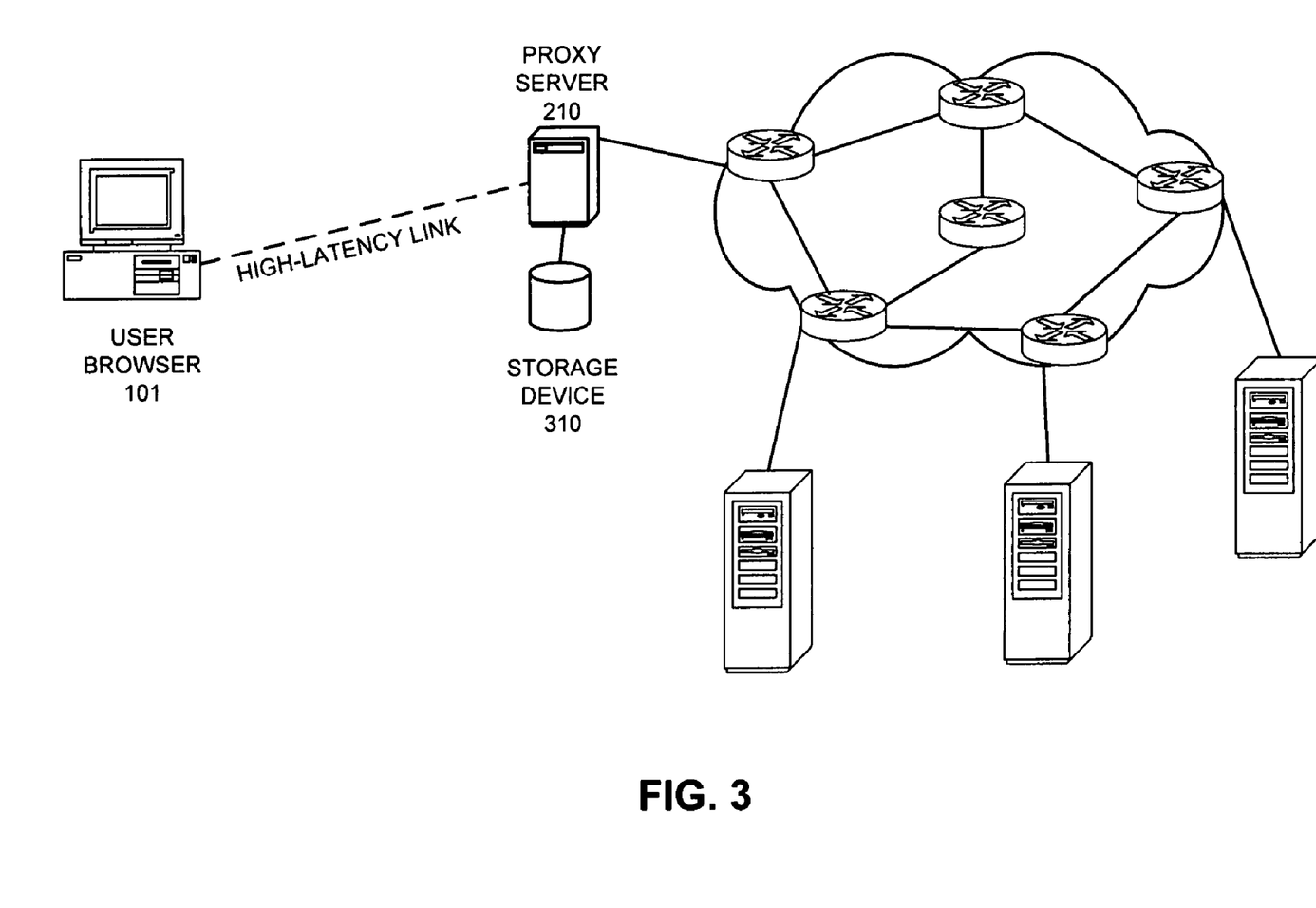
FIG. 3 illustrates the process of storing substitute web pages or web components in a cache in accordance with an embodiment of the present invention.

FIG. 3 illustrates the process of storing substitute web pages or web components in a cache in accordance with an embodiment of the present invention. In one embodiment of the present invention, proxy server 210 stores the graphical images and image maps it creates in a storage device 310, which can be located locally or remotely from proxy server 210. Storage device 310 essentially serves as a cache, which allows proxy server 210 to re-use the graphical images and image maps when user browser 101 requests a web page it has requested before.

In another embodiment of the present invention, proxy server 210 stores the received components of a target web page in storage device 310. This allows proxy server 210 to re-use the components it has received while assembling web pages containing identical components.

Figure 4:
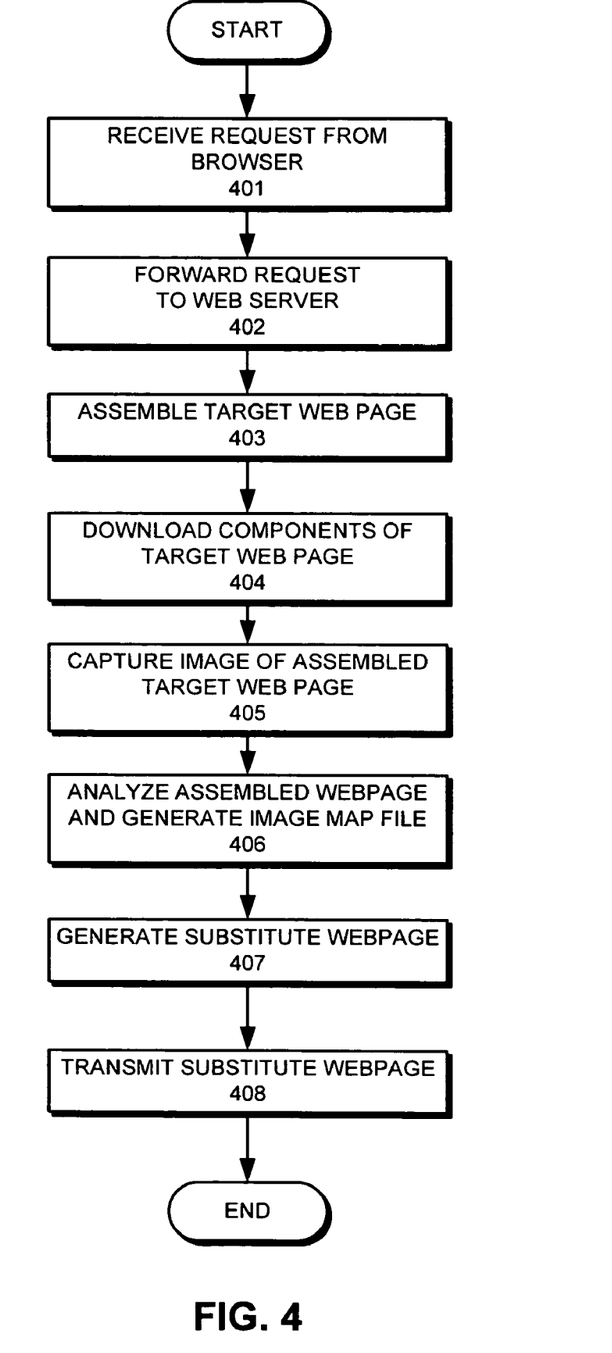
FIG. 4 presents a flow chart illustrating the process of generating of a substitute web page at a proxy server in accordance with an embodiment of the present invention.

FIG. 4 presents a flow chart illustrating the process of generating substitute web page at a proxy server in accordance with an embodiment of the present invention. The proxy server system initially receives a request from a browser to retrieve a target web page (step 401). The system then forwards the request to a host server where the target web page's source code is stored (step 402). After receiving the source code for the target web page from the host server, the system assembles the target web page (step 403). During this assembly process, the system may need to download components contained in the target web page (step 404). After successfully assembling the target web page, the system captures a graphical image of it with a specified resolution, and stores the image in a file (step 405). The system also analyses the assembled target web page and generates a corresponding image map that specifies where the hyperlinks are located in the target web page (step 406). Next, the system generates a substitute web page containing the graphical image and the image map (step 407), and transmits this substitute web page to the browser (step 408).

Figure 5:
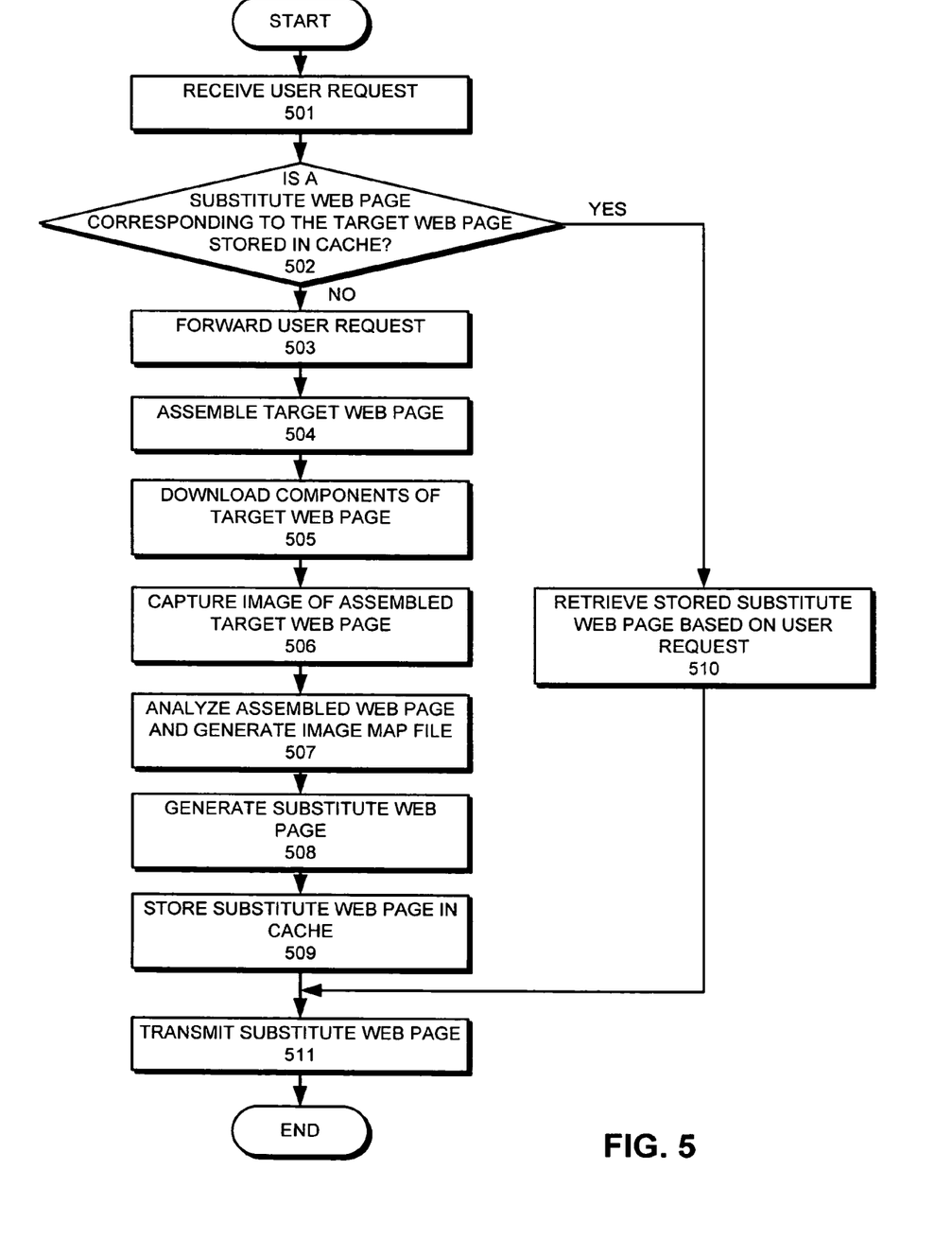
FIG. 5 presents a flow chart illustrating the process of storing substitute web pages in a cache in accordance with an embodiment of the present invention.

FIG. 5 presents a flow chart illustrating the process of storing substitute web pages in a cache in accordance with an embodiment of the present invention. The proxy server system starts by receiving a request from a browser to retrieve a target web page (step 501). The system then determines whether a substitute web page corresponding to the target web page is stored in the cache (step 502). If so, the system retrieves the stored substitute web page (step 510) and transmits the substitute web page to the browser (step 511). If the target web page is not stored in the cache, the system forwards the request to the host server where the target web page's source code is stored (step 503). After receiving the source code, the system assembles the target web page (step 504). During the assembly process, the system may need to download components contained in the target web page (step 505). Note that these downloads take place over a low-latency Internet connection.

After successfully assembling the target web page, the system captures a graphical image of it with a specified resolution, and stores the image in a file (step 506). The system also analyses the assembled target web page and generates a corresponding image map (step 507). Next, the system generates a substitute web page containing the graphical image and the image map (step 508), and stores the substitute web page with the graphical image and image map in the cache (step 509). The system then transmits this substitute web page to the user browser (step 511).

Figure 6:
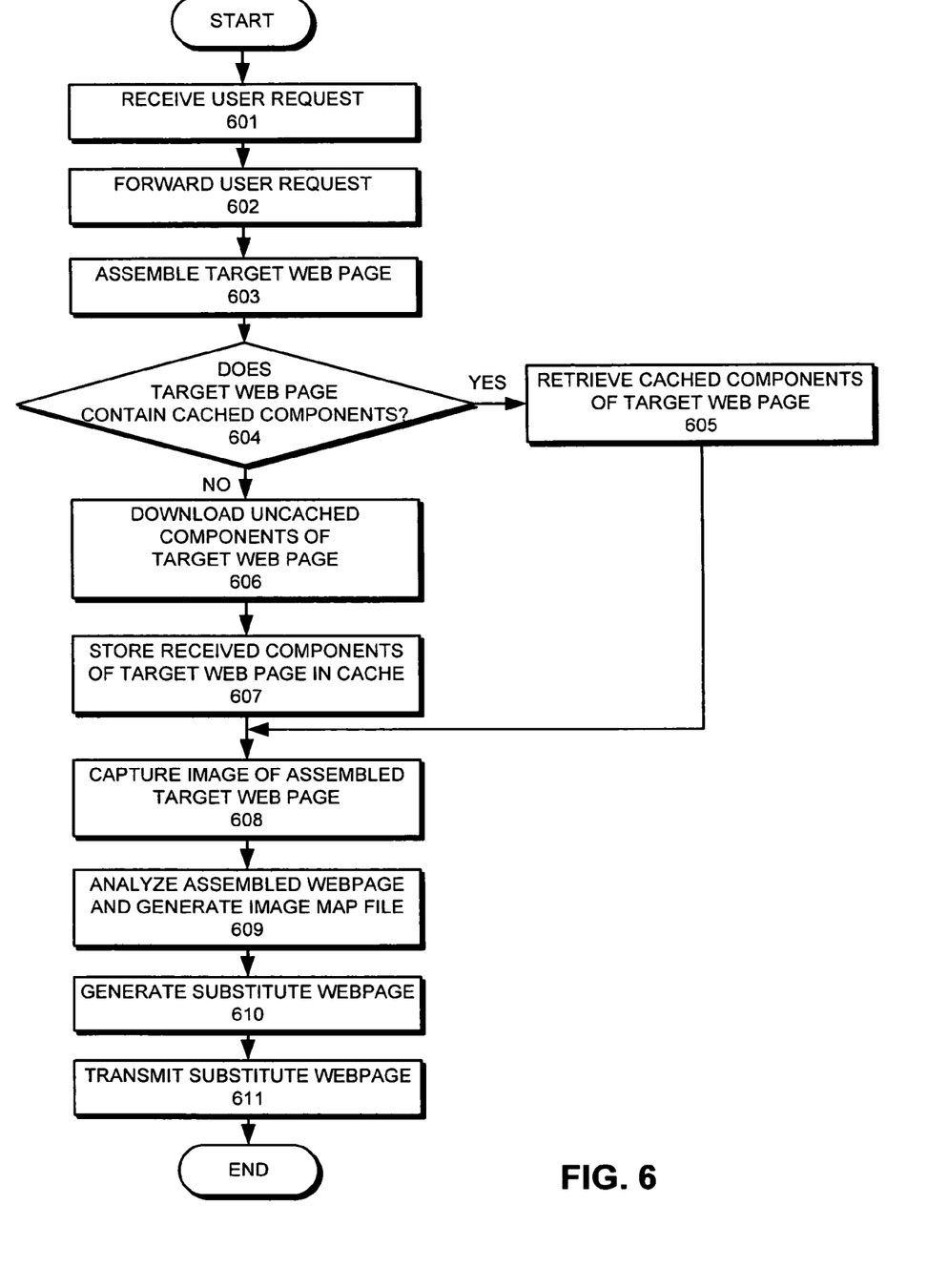
FIG. 6 presents a flow chart illustrating the process of storing web components in a cache in accordance with an embodiment of the present invention.

FIG. 6 presents a flow chart illustrating the process of storing web components in a cache in accordance with an embodiment of the present invention. The proxy server system starts by receiving a request from a browser to retrieve a target web page (step 601). The system then forwards the request to a web server where the target web page's source code is stored (step 602). After receiving the source code, the system assembles the target web page (step 603). During the assembly process, the system determines whether the target web page contains cached components (step 604). If so, the system retrieves cached components contained in the target web page during the assembly process. If there are uncached components, the system downloads these uncached components from their respective servers (step 606), and then stores the received components in the cache (step 607). After successfully assembling the target web page, the system captures a graphical image of it with a specified resolution, and stores the image in a file (step 608). The system also analyses the assembled target web page to determine the locations of hyperlinks in the target web page and generates a corresponding image map (step 609). Next, the system generates a substitute web page containing the graphical image and the image map (step 610), and transmits this substitute web page to the user browser (step 611).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for reducing the latency involved in retrieving a web page, comprising:
    receiving a request from a browser to retrieve a target web page, wherein the request is received at a proxy server positioned between a high-latency satellite connection and a low-latency Internet connection, wherein the proxy server retrieves the target web page with low latency;
    forwarding the request to a host server;
    receiving components comprising the target web page at the proxy server;
    generating a graphical image of the target web page as a substitute web page, wherein the substitute web page includes the graphical image and a corresponding image map that assigns certain regions of the graphical image to corresponding hyperlinks, and wherein generating the graphical image involves assembling the target web page from the received components in a virtual terminal environment; and
    transferring the entire substitute web page to the browser in a single transfer across the high-latency satellite connection;
    wherein transferring the substitute web page involves only a single round-trip delay between the user browser and the proxy server, instead of multiple round-trip delays in transferring all the components individually in the actual target web page, thereby reducing the latency of web page loading at the user browser over the high-latency satellite connection to the Internet.

2. The method of claim 1, wherein generating the substitute web page involves capturing the assembled target web page to the graphical image.

3. The method of claim 2, further comprising allowing the browser or a user associated with the browser to specify a resolution of the graphical image, thereby controlling the size of the graphical image.

4. The method of claim 2, further comprising analyzing the assembled target web page and generating an image map corresponding to the graphical image, wherein the hyperlinks contained within the target web page are specified in the image map.

5. The method of claim 4, wherein transferring the graphical image of the target web page to the browser involves sending both the graphical image and the image map to the browser.

6. The method of claim 4, further comprising storing the graphical image and the image map in a storage device, so they are re-sent to the browser if the browser sends a subsequent request to retrieve the same target web page.

7. The method of claim 4, further comprising storing the received components of the target web page in a storage device, so that the stored components are easily retrieved if the browser sends a subsequent request to retrieve a web page that contains some of the stored components.

8. A computer-readable storage medium storing instructions that when executed by a computer cause the computer to perform a method for reducing the latency involved in retrieving a web page, comprising:
    receiving a request from a browser to retrieve a target web page, wherein the request is received at a proxy server positioned between a high-latency satellite connection and a low-latency Internet connection, wherein the proxy server retrieves the target web page with low latency;
    forwarding the request to a host server;
    receiving components comprising the target web page at the proxy server;
    generating a graphical image of the target web page as a substitute web page, wherein the substitute web page includes the graphical image and a corresponding image map that assigns certain regions of the graphical image to corresponding hyperlinks, and wherein generating the graphical image involves assembling the target web page from the received components in a virtual terminal environment; and transferring the entire substitute web page to the browser in a single transfer across the high-latency satellite connection;

wherein transferring the substitute web page involves only a single round-trip delay between the user browser and the proxy server, instead of multiple round-trip delays in transferring all the components individually in the actual target web page, thereby reducing the latency of web page loading at the user browser over the high-latency satellite connection to the Internet.

9. The computer-readable storage medium of claim 8, wherein generating the substitute web page involves capturing the assembled target web page to the graphical image.

10. The computer-readable storage medium of claim 9, wherein the method further comprises allowing the browser or a user associated with the browser to specify a resolution of the graphical image, thereby controlling the size of the graphical image.

11. The computer-readable storage medium of claim 9, wherein the method further comprises analyzing the assembled target web page and generating an image map corresponding to the graphical image, wherein the hyperlinks contained within the target web page are specified in the image map.

12. The computer-readable storage medium of claim 11, wherein transferring the graphical image of the target web page to the browser involves sending both the graphical image and the image map to the browser.

13. The computer-readable storage medium of claim 11, wherein the method further comprises storing the graphical image and the image map in a storage device, so they are re-sent to the browser if the browser sends a subsequent request to retrieve the same target web page.

14. The computer-readable storage medium of claim 11, wherein the method further comprises storing the received components of the target web page in a storage device, so that the stored components are easily retrieved if the browser sends a subsequent request to retrieve a web page that contains some of the stored components.

15. A computer system that reduces the latency involved in retrieving a web page, comprising:

a processor;

a memory;

a receiving mechanism configured to receive a request from a browser to retrieve a target web page;

a forwarding mechanism configured to forward the request to a proxy server, whereby the receiving mechanism is further configured to receive components which comprise the target web page and which are sent in response to the request;

a web page generating mechanism in the proxy server configured to generate a graphic image of the target web page as a substitute web page, wherein the substitute web page includes the graphical image and a corresponding image map that assigns certain regions of the graphical image to corresponding hyperlinks, and wherein the web page generating mechanism is configured to generate the graphical image by assembling the target web page from the received components in a virtual terminal environment; and a transferring mechanism in the proxy server configured to transfer the entire substitute web page to the browser in a single transfer across a high-latency connection between the browser and the proxy server;

wherein transferring the substitute web page involves only a single round-trip delay between the browser and the proxy server, instead of multiple round-trip delays in transferring all the components individually in the target web page, thereby reducing the latency of web page loading at the browser over the high-latency connection.

16. The computer system of claim 15, wherein the web page generating mechanism is further configured to capture the assembled target web page to the graphical image.

17. The computer system of claim 16, wherein the web page generating mechanism is further configured to allow the browser or a user associated with the browser to specify a resolution of the graphical image, thereby controlling the size of the graphical image.

18. The computer system of claim 16, wherein the web page generating mechanism is further configured to analyze the assembled target web page and to generate an image map corresponding to the graphical image, wherein the hyperlinks contained within the target web page are specified in the image map.

19. The computer system of claim 18, wherein transferring the graphical image of the target web page to the browser involves sending both the graphical image and the image map to the browser.

20. The computer system of claim 18, further comprising a storage device configured to store the graphical image and the image map, so they are re-sent to the browser if the browser sends a subsequent request to retrieve the same target web page.

21. The computer system of claim 18, further comprising a storage device configured to store the received components of the target web page, so that the stored components are easily retrieved if the browser sends a subsequent request to retrieve a web page that contains some of the stored components.

* * * * *

UNITED STATES PATENT AND TRADEMARK OFFICE
CERTIFICATE OF CORRECTION

| | | |
|---|---|---|
| PATENT NO. | : 7,617,294 B1 | Page 1 of 1 |
| APPLICATION NO. | : 10/910432 | |
| DATED | : November 10, 2009 | |
| INVENTOR(S) | : Michael A. Harding | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1253 days.

Signed and Sealed this

Nineteenth Day of October, 2010

David J. Kappos
*Director of the United States Patent and Trademark Office*